United States Patent [19]

Peter et al.

[11] Patent Number: 5,216,674
[45] Date of Patent: Jun. 1, 1993

[54] METHOD OF AND DEVICE FOR BRINGING A NETWORK INTERFACE OUT OF A SLEEP MODE INTO A WAKE-UP STATE

[75] Inventors: Cornelius Peter, Ottersweier; Siegfried Dais, Gerlingen, both of Fed. Rep. of Germany

[73] Assignee: Robert Bosch GmbH, Stuttgart, Fed. Rep. of Germany

[21] Appl. No.: 576,382
[22] PCT Filed: Feb. 17, 1989
[86] PCT No.: PCT/DE89/00091
§ 371 Date: Aug. 31, 1990
§ 102(e) Date: Aug. 31, 1990
[87] PCT Pub. No.: WO90/09713
PCT Pub. Date: Aug. 23, 1990

[51] Int. Cl.⁵ .............................. G06F 11/00
[52] U.S. Cl. ...................... 371/29.5; 361/88; 371/8.2
[58] Field of Search .......... 371/8.2, 29.5, 66; 361/86, 88; 324/522

[56] References Cited

U.S. PATENT DOCUMENTS

| | | | |
|---|---|---|---|
| 4,016,408 | 4/1977 | Koetzle | 371/66 |
| 4,068,105 | 1/1978 | Jain et al. | 371/11.2 |
| 4,159,470 | 6/1979 | Strojny et al. | 371/66 |
| 4,698,582 | 10/1987 | Braun et al. | 361/86 |
| 4,833,414 | 5/1989 | Heller | 324/522 |
| 4,916,570 | 4/1990 | Dale | 361/86 |
| 4,951,283 | 8/1990 | Mastrocola et al. | 371/29.5 |
| 4,952,913 | 8/1990 | Pauley et al. | 340/573 |

OTHER PUBLICATIONS

Rasko, Power-Loss Detection Circuit, IBM Technical Disclosure Bulletin, vol. 22, No. 8B, Jan. 1980, p. 3795.

Primary Examiner—Charles E. Atkinson
Attorney, Agent, or Firm—Michael J. Striker

[57] ABSTRACT

An activation device for bringing an network interface of a computer network for a motor vehicle, with at least two bus lines, out of a sleep mode into a wake-up mode. The activation device includes a signal flank change detection circuit, which is coupled to the bus lines and a reference voltage. In the event of an interruption or in the event of a short-circuit of one of the bus lines to ground or to a supply voltage of the computer network, the circuit evaluates a signal arriving on the other, intact bus line and emits a wake-up signal for the activation of the network interface. The flank change detection circuit has two comparators (5, 7), which are connected to the bus lines (U−, U+) and via a voltage divider (19) to a reference voltage ($V_{cc}/2$). A voltage offset is produced by the voltage divider (19), by which offset the network interface can be brought into wake-up mode in the event of a short-circuit of the bus lines between each other, even if it was in sleep mode when the fault occurred.

8 Claims, 2 Drawing Sheets

METHOD OF AND DEVICE FOR BRINGING A NETWORK INTERFACE OUT OF A SLEEP MODE INTO A WAKE-UP STATE

BACKGROUND OF THE INVENTION

The invention relates to a network interface of a computer network having at least two bus lines and a plurality of substations interconnected by the bus lines. In particular, the present invention relates to a method of and a device for activating such a network interface out of a sleep mode into a wake-up mode even in the case of a failure of one bus line.

Computer controlled networks are being used more and more frequently, in particular also in motor vehicle construction. In particular, so-called controller area network interfaces for motor vehicles are known, which connect via the bus lines a multiplicity of components, subsystems and/or systems forming the respective substations of the network. The information items or bits of the network run via the two bus or signal lines. Any failure of one of the two signal lines due to short-circuiting to ground or to the voltage supply or an interruption of the lines has the consequence that communication among substations of the entire network breaks down. This is also the case if a short-circuit occurs between the two bus lines.

In my German Patent Application P 38 26 774, corresponding to U.S. patent application Ser. No. 466,283, filed Mar. 19, 1990 and assigned to the same assignee, it has been proposed for the detection and elimination of a global fault on the signal lines of the multiplex bus to provide the network interface with a fault detection device including a counter, with the aid of which an absence of information on the signal lines can be detected. However, the detection is possible only in the wake-up mode of operation of the interface.

SUMMARY OF THE INVENTION

The network interface in combination with the activation device according to the invention, in comparison with prior art interfaces of this kind, has the advantage that interface operation can be maintained even in the event of failure of one of the signal or bus lines of a network due to interruption or short-circuiting. In particular, it is possible to activate a network interface which is in sleep mode, i.e. to bring it into wake-up mode.

An exemplary embodiment of an activation device which has at least two comparators, the first input of which is coupled to one of the bus lines and the second input of which is coupled to a reference voltage, is particularly preferred. The outputs of the two comparators are connected to an evaluation circuit. Such an activation device of a network interface is of a very simple design. Slowly operating components, which are consequently very inexpensive, can be used as comparators. A network interface of such design is also distinguished by a very low closed-circuit current.

Also preferred is an exemplary embodiment in which the evaluation circuit is designed as an OR gate, the output of which emits a wake-up signal when an edge change occurs on an intact bus line. This wake-up signal has the effect of bringing the network interface out of sleep mode into the wake-up state, i.e. activating the interface. This exemplary embodiment can also be realised very inexpensively.

The network interface in combination with the activation device according to the invention has in comparison with the prior art the advantage that interface operation can also be maintained if there is a short-circuiting of the signal or bus lines of the network between each other. As a result, a very high operational reliability is ensured, even if faults occur in the network.

A preferred embodiment of this interface is distinguished by the fact that the activation device assigned to the bus lines and a reference voltage, which serves for the activation of the network interface in the event of a short-circuit of the buslines between each other and emits a wake-up signal, has at least two comparators, the first input of which is assigned to one of the bus lines and the second input of which is assigned to a reference voltage. In this case, a voltage offset between the two inputs of the comparators is produced by a voltage divider. The outputs of the comparators are connected to an evaluation circuit. This network interface too is distinguished by a particularly simple and consequently inexpensive design. Slowly operating comparators can also be used. This circuit design additionally has the advantage that there is only a very low closed-circuit current.

BRIEF DESCRIPTION OF THE DRAWINGS

An exemplary embodiment of the invention is explained in more detail in the following description and is represented in the drawings, in which.

DESCRIPTION OF THE PREFERRED EMBODIMENT

Figure 1:
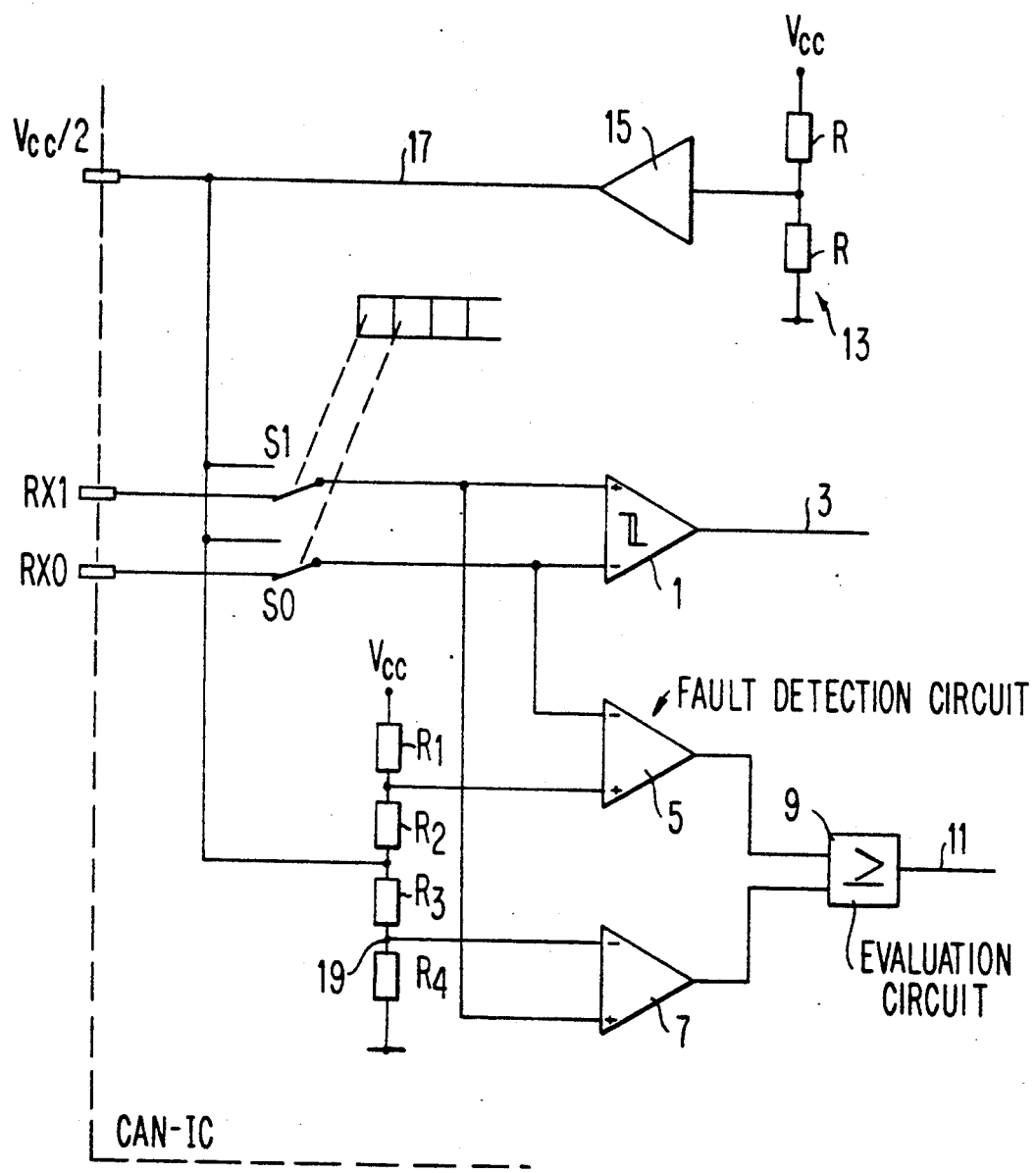
FIG. 1 shows a portion of a network interface according to the invention including an activation device.

In FIG. 1, only a cut-out portion of a network substation is shown, namely the receiver section of a controller area network interface module CAN-IC.

At a first terminal RX1, which is connected to the bus line U−, a first input of a reception comparator 1 is connected. The second input of this comparator is connected to the terminal RX0, which is in connection with the second bus line U+.

On the output line 3 of the comparator 1, a reception signal is emitted, which is evaluated by the interface module.

The interface CAN-IC module, such as that shown in part in FIG. 1, is not permanently activated. At times it is in an inactive state, in so-called sleep mode. In this operating state, the internal logic of the module is currentless. Only a signal or fault change detection circuit, which here consists of the comparators 5 and 7, is energized. It serves to reactivate the circuit of the interface module when required, to bring it into the so-called wake-up state.

The changeover from wake mode to sleep mode has the effect on the one hand of saving the modules of the network substation or of the interface, on the other hand of substantially reducing the current consumption of the overall network.

In the case of the exemplary embodiment explained, the first comparator 5 of the flank change detection circuit is connected by its inverting input to the input terminal RX0. Its non-inverting input is connected to a reference voltage $V_{cc}/2$.

The second comparator 7 of the flank change detection circuit is connected on the one hand, namely by its non-inverting input, to the input terminal RX1 of the interface and on the other hand by its inverting input to the reference voltage $V_{cc}/2$.

The outputs of the two comparators are connected to an OR gate 9, the output of which emits a wake-up signal for the activation of the network interface.

In the case of the exemplary embodiment shown in FIG. 1, the reference voltage is generated by means of a voltage divider 13, which is connected on the one hand to the supply voltage $V_{cc}$ and on the other hand to ground. It has two series-connected resistors R, at the junction of which a buffer operational amplifier 15 is connected, which serves for the low-resistance voltage coupling. The output 17 of the operational amplifier 15 is connected to an output terminal $V_{cc}/2$ of the network interface. This voltage $V_{cc}/2$ serves as reference voltage of the comparators 5 and 7.

This reference voltage can be fed directly to the comparators 5 and 7, i.e. applied to the non-inverting input of the first comparator 5 and to the inverting input of the second comparator 7.

However, in the case of the exemplary embodiment shown here, a second voltage divider 19 is provided, which here consists of four series-connected resistors R1 to R4. It is connected on the one hand to the supply voltage $V_{cc}$ and on the other hand to ground. The non-inverting input of the first comparator 5 is not directly connected to the reference voltage $V_{cc}/2$ but via the resistor R2. Similarly, the inverting input of the second comparator is not directly connected to the output 17 of the buffer operational amplifier 15. Rather, a resistor R3 is interposed. These interposed resistors have the effect of producing a voltage offset between the two inputs of the comparators 5 and 7. By a suitable choice of the resistors R2 and R3, the potential of the non-inverting input of the comparator 5 is, for example, 30 mV above the reference voltage $V_{cc}$ and the potential at the inverting input of the second comparator 7 is 30 mV below the reference voltage.

Between the non-inverting input of the first comparator 5 and the supply voltage $V_{cc}$ is the resistor R1 and between the inverting input of the second comparator 7 and ground is the resistor R4.

A first switch S1 is connected between the first input of the input comparator 1 and the terminal RX1 and a second switch S0 is connected between the second input of the input comparator 1 and the terminal RX0. The two switches are switched from the illustrated non-activated state by an error status register, which is described in more detail in the aforedescribed U.S. patent application Ser. No. 466,283. The two switches are changeover contacts, which in the activated state of the switch S1 connected the first input of the comparator 1 to the reference voltage $V_{cc}/2$ on the line 17 or, on operation of the switch S0, connected the second input of the comparator 1 to this reference voltage.

The function of the receiver section of the network interface shown in FIG. 1 is explained in more detail below:

With the aid of the flank change detection circuit comprising the two comparators 5 and 7, the voltages at the input terminals RX0 and RX1 are compared with the reference voltage at the output 17 of the buffer 15.

If one of the signal or bus lines U− or U+ fails, i.e. is interrupted or a short-circuit to ground or to the supply voltage occurs, during sleep mode, an output signal is emitted by the comparators 5 and 7 of the flank change detection circuit to the OR gate 9 as soon as an edge or flank change of a signal occurs on the still intact bus line. As a result, a wake-up signal is produced at the output 11 of the OR gate.

It is also conceivable that, due to the short-circuit on one of the bus lines, an edge or flank change of a signal at one of the comparators 5 or 7 leads to a comparator output signal, as a result of which the OR gate emits a wake-up signal on the output line 11.

For the case where a short-circuit of the two bus lines between each other during sleep mode is to be detected, the voltage offset is specified by the second voltage divider 19. In the case of such a short-circuit, one of the two comparators 5 or 7 emits an output signal to the evaluation circuit or the OR gate 9, so that a wake-up signal occurs on the output line 11 of the latter.

For the case where a short-circuit of the bus lines between each other need not be detected, the voltage divider 19 can be dispensed with. The output 17 of the buffer operational amplifier 15 can then be connected directly to the non-inverting input of the comparator 5 and to the inverting input of the comparator 7.

As mentioned before, with the circuit described in the U.S. patent application Ser. No. 466,283, a fault occurring during the operation of the bus or network interface, that is to say a short-circuit of one of the bus lines between each other or to ground or to the supply voltage, can be detected. If, however, this network interface is brought into the so-called sleep or deactivated state, this prior art circuit is no longer able to detect faults which occur in this operating phase. Consequently, after the occurrence of a faulty, it is not possible to activate the network interface out of a sleep mode and bring it into wake-up mode.

On the other hand, a network interface with an activation device shown in FIG. 1 can even be activated or brought into wake-up mode whenever a fault occurs on one of the bus lines U− and U+ while the network interface is in sleep mode.

After the activation of the network interface by the wake-up signal at the output 11 of the OR gate 9, the fault detection and elimination described in the U.S. patent application Ser. No. 466,283 can come into action.

Figure 2:
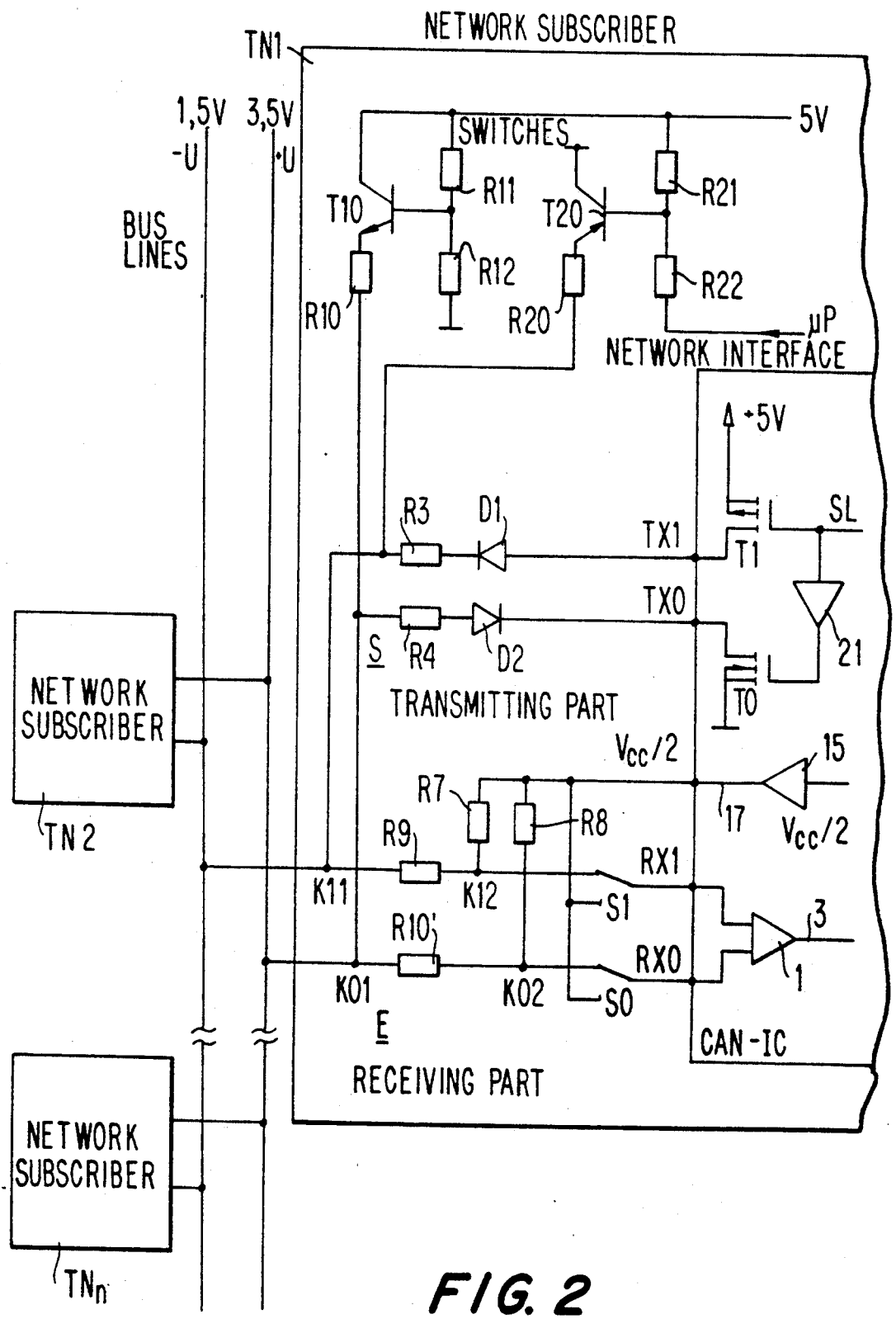
FIG. 2 shows a bus system with n substations of a computer network of a motor vehicle.

FIG. 2 shows a network, for example a motor vehicle bus system with n substations TN1 - TN$_n$. The bus coupling is shown in more detail in the case of the substation TN1.

The substation Tn1 is designed here by way of example as a so-called master node, i.e. it has a termination network with electronic switches T10 and T20.

The first electronic switch T10, designed as an npn transistor, is assigned to the bus line U+. It is connected by its collector to a voltage supply with, for example, 5 V. Its emitter is connected via a resistor R10 to a node point K01 and consequently to the bus line U+. The base of the transistor T10 is connected to the junction of two resistors R11 and R12, which form a voltage divider between the supply voltage and ground.

In the case of the exemplary embodiment shown here, the resistor R10 has a resistance value of 2 k, the resistor R11 of 33 k and R12 of 150 k.

The second electronic switch T20 of the termination network is designed as a pnp transistor, the collector of which is connected to ground and the emitter of which is connected via a resistor R20 to a node K11 and to the bus line U−. The base of the transistor T20 is connected to the junction of two resistors R21 and 22, which form a voltage divider. The latter is connected on the one hand to the supply voltage with 5 V and on the other hand to the connection terminal of a microprocessor.

The termination network described above is provided only once within the bus system. In other words, the network substations TN2 to TN$_n$ have no termination network. Otherwise, they correspond to the substation TN1, which is explained in more detail below.

Each substation has a transmitter section S and a receiver section E.

For reasons of better clarity, the network interface on a CAN-IC of only one substation TN1, its external wiring and coupling to the two signal or bus lines are shown. The interface has a first driver stage T1, which is assigned to the bus line U−. For simplicity, here only one electronic switch of the driver stage is shown, which is connected on the one hand to the supply voltage of +5 V and on the other hand to an output terminal TX1 of the CAN-IC. This terminal is connected via a diode D1 and a resistor R3 to the node K11, which for its part is in connection with the bus line U−. The guide D1 is poled such that its anode is at the terminal TX1.

If the driver stage T1 is low-resistant, the terminal TX1 is consequently at the supply voltage with +5 V.

At the terminal TX0, the second driver stage T0 is connected, of which for simplicity only an electronic switch is shown. The latter is connected on the one hand to ground and on the other hand to the output terminal TX1, at which the cathode of a diode D2 is connected, the anode of which is connected via a resistor R4 to the node K01, which is for its part in a conductive connection with the bus line U+.

If the driver stage T2 is low-resistant, the terminal TX0 is thus connected to ground. The driver stages T1 and T2 are inversely connected. They are driven via a control line SL, the driver stage T1 being connected directly to the control line and the control line of the driver stage T0 via an inverter 21.

The external wiring of the receiver section of the interface module CAN-IC can be seen from FIG. 2. In the case of the internal wiring of the module, for simplicity of the representation, the comparators 5 and 7 and their wiring, which are shown in more detail in FIG. 1, have been omitted.

However, comparator 1, lying at the terminals RX1 and RX0 can be recognised, which comparator serves as input comparator and emits on its output line 3 the reception signal corresponding to the information on the bus lines U− and U+.

In this representation, the two switches S1 and S0 are not arranged on the CAN-IC module. However, their function is identical to those shown in FIG. 1.

The terminal RX0 of the receiver section is led via the changeover contact of the switch S0 to a node K02 and connected from there via a resistor R10' to the node K01 and to the bus line U+. The input terminal RX1 is connected via a changeover contact of the switch S1 to the node K12 and via the resistor R9 to the node K11 and to the bus line U−.

The node points K12 and K02 are connected via suitable resistors to the reference voltage V$_{cc}$/2, that is to say to the output line 17 of the buffer operational amplifier 15. In this case, a resistor R7 is provided between the node K12 and the reference voltage and a resistor R8 is provided between the node K02 and the reference voltage. As in FIG. 1, the reference voltage is applied to the changeover contact of the switches S0 and S1. These switches are in turn assigned to a status register (not shown here), which takes care of the changeover of these contacts.

Thus, in parallel with the comparator 1 shown in FIG. 1 are the additional comparators 5 and 7, the outputs of which are connected to an evaluation circuit 9, as is shown in FIG. 1. The voltage divider 19 is also provided in FIG. 2 on the CAN-IC module. As mentioned, it has been omitted for reasons of better clarity.

Each of the substations TN1 to TN$_n$ is connected to the bus lines U− and U+, there being an output potential of, for example, 1.5 V on the bus line U− and a potential of 3.5 V on the bus line U+.

It is evident from the functional description of the circuit shown in FIG. 1 that the substations Tn1 to TN$_n$ of the bus system shown in FIG. 2 can also be activated in the event of a fault occurring on the bus lines if this fault occurs during the inactive phase, that is to say during sleep mode.

Due to the termination network of the substation TN1, the bus line U− can be switched off in the event of a short-circuit between the two bus lines U− and U+. That is to say the transistor T20 is brought into conductive state via a control signal of the microprocessor, so that the bus line U− is connected to ground via the resistor R20.

This makes it possible even in this case to evaluate the information on the bus lines with the aid of the receiving comparator 1.

We claim:

1. A device for activating a network interface of a computer controlled network including two bus lines and at least two substations each including a network interface switchable into a sleep mode or a wake-up mode of operation, each of the network interfaces connecting a signal transmitting part and a signal receiving part of an assigned substation to said bus lines, and each including means for detecting a fault occurring on one of said bus lines during the wake-up mode, said activating device comprising means for detecting a flank change of a signal on the respective bus lines; means for generating a wake-up signal in response to the detection of a signal flank change on one of the two bus lines; and said wake-up signal activating a network interface out of a sleep mode into a wake-up mode.

2. A device according to claim 1, wherein each of said network interfaces includes a source of a reference voltage, and means for detecting the flank change comprises two comparators each having a first input connected to said source of reference voltage and a second input connected to the respective bus lines; and an evaluation circuit having an output, an input connected to an output of one of the comparators and another input connected to an output of the other comparator.

3. A device according to claim 2, wherein said evaluation circuit is an OR gate for producing at its output said wake-up signal whenever an output signal from said comparators is applied at least to one of its inputs.

4. A device according to claim 2, wherein said source of reference voltage includes a low-resistance coupling in the form of a buffer operational amplifier having an input connected via a voltage divider to a power source and an output connected to a reference voltage terminal.

5. A device according to claim 4, wherein said means for detecting the flank change further comprises additional voltage dividers connected between said reference voltage terminal and the second inputs of the respective comparators to produce a voltage offset between said second inputs.

6. A device according to claim 1, wherein said computer controlled network is a component part of a motor vehicle.

7. A method of activating a network interface of a computer controlled network including two bus lines and at least two substations each including a network interface switchable into a sleep mode or a wake-up mode of operation, each of the network interfaces connecting a signal transmitting part and a signal receiving part of an assigned substation to said bus lines, and each including means for detecting a fault occurring on one of said bus lines during the wake-up mode, the method comprising the steps of detecting a flank change of signals arriving on the respective bus lines; and, on detection of a signal flank change on at least one bus line, activating a network interface out of a sleep mode into a wake-up mode.

8. A method as defined in claim 7, wherein, in the event of a short-circuiting of the bus lines between each other, detecting a flank change of a signal on one of said bus lines.

* * * * *